US009948648B1

(12) United States Patent
King-Britton (10) Patent No.: US 9,948,648 B1
(45) Date of Patent: Apr. 17, 2018

(54) SYSTEM AND METHOD FOR ENFORCING ACCESS CONTROL TO PUBLICLY-ACCESSIBLE WEB APPLICATIONS (71) Applicant: Quest Software, Inc., Aliso Viejo, CA (US)

(72) Inventor: Dan King-Britton, Curry Rivel (GB)

(73) Assignee: Dell Software Inc., Aliso Viejo, CA (US)

( * ) Notice: Subject to any disclaimer, the term of this patent is extended or adjusted under 35 U.S.C. 154(b) by 38 days.

(21) Appl. No.: 13/804,064

(22) Filed: Mar. 14, 2013

(51) Int. Cl.
G06F 7/04 (2006.01)
H04L 29/06 (2006.01)
(52) U.S. Cl.
CPC .................... H04L 63/10 (2013.01)
(58) Field of Classification Search
CPC ....................................... H04L 63/10
See application file for complete search history.

(56) References Cited

U.S. PATENT DOCUMENTS

| | | | | |
|---|---|---|---|---|
| 6,947,404 B1* | 9/2005 | Zalka | ........... | H04L 63/0815 370/338 |
| 7,246,230 B2* | 7/2007 | Stanko | ........... | H04L 63/0807 709/229 |
| 7,747,856 B2* | 6/2010 | Favazza | ........... | H04L 63/0807 709/225 |
| 8,255,984 B1* | 8/2012 | Ghostine | ........... | G06F 21/41 709/217 |
| 8,327,434 B2* | 12/2012 | Bowen | ........... | H04L 63/08 713/153 |
| 8,418,238 B2* | 4/2013 | Platt | ........... | H04L 63/0815 726/1 |

(Continued)

OTHER PUBLICATIONS

Roth, Greg, "Single Sign-on Overview", 2012, 4 pages.

(Continued)

Primary Examiner — Khoi Le
(74) Attorney, Agent, or Firm — Winstead PC (57) ABSTRACT

A method for enforcing access control to a web application. The method includes generating a computationally-secure pseudo-random password, associating the generated computationally-secure pseudo-random password with an application username of at least one web client, and storing, in a user account credential store module, the generated computationally-secure pseudo-random password and the associated application username. The method also includes requesting, via a web proxy connected to the at least one web client, access to a protected page offered by the web application, intercepting, by the web proxy, a login page from the web application, and inserting, by the web proxy on behalf of the at least one web client, the stored generated computationally-secure pseudo-random password and the associated application username into the login page. The method also includes forwarding the login page with the inserted computationally-secure pseudo-random password and the associated application username to the web application to complete, by the web proxy, an authentication process with the web application to allow the at least one web client to access the protected page offered by the web application.

19 Claims, 4 Drawing Sheets (56) References Cited

U.S. PATENT DOCUMENTS

| | | | | |
|---|---|---|---|---|
| 8,955,094 | B2* | 2/2015 | Readshaw | H04L 63/0281 |
| | | | | 713/189 |
| 9,282,098 | B1* | 3/2016 | Hitchcock | H04L 63/0884 |
| 2006/0218629 | A1* | 9/2006 | Pearson | G06F 17/30873 |
| | | | | 726/8 |
| 2008/0163337 | A1* | 7/2008 | Tuliani | H04L 63/0245 |
| | | | | 726/2 |
| 2009/0249439 | A1* | 10/2009 | Olden | H04L 63/0815 |
| | | | | 726/1 |
| 2009/0249440 | A1* | 10/2009 | Platt | H04L 63/0815 |
| | | | | 726/1 |
| 2010/0199086 | A1* | 8/2010 | Kuang | H04L 63/0869 |
| | | | | 713/155 |
| 2011/0154464 | A1* | 6/2011 | Agarwal | H04L 63/0815 |
| | | | | 726/8 |
| 2012/0167193 | A1* | 6/2012 | Gargaro | G06F 21/41 |
| | | | | 726/8 |
| 2012/0278872 | A1* | 11/2012 | Woelfel | H04L 61/2596 |
| | | | | 726/7 |

OTHER PUBLICATIONS

Mittal, Kunal, "Extend single sign-on to the cloud", IBM Corporation, Oct. 19, 2012, 9 pages.

Fulton, J., "10 Topics to Ask Your SSO Vendor", DigitalPersona, Inc., Jul. 2012, 13 pages.

* cited by examiner

SYSTEM AND METHOD FOR ENFORCING ACCESS CONTROL TO PUBLICLY-ACCESSIBLE WEB APPLICATIONS

BACKGROUND

Technical Field

The present invention relates generally to user access control and more particularly, but not by way of limitation, to systems and methods for controlling user authentication and authorization to access web applications via a web proxy.

History of Related Art

A number of large organizations are adopting a proxy-based approach for managing and securing access and control to their enterprise applications. For applications that are locally resident and managed by the enterprise, this is fairly straightforward to implement. Implementing a firewalled infrastructure enables the organization to enforce authentication and authorization policies via a reverse web proxy acting as a security gateway to applications on an internal private network. The reverse web proxy applies and enforces corporate access control and authorization policies as required by the organization.

Publicly-accessible applications reside outside an enterprise infrastructure and typically provide "Software as a Service" (SaaS), where multiple organizations (tenants) make use of the services provided through a shared public interface. Because the publicly-accessible applications are not managed by the organization, access to the publicly-accessible applications cannot be constrained by that organization using a firewall to prevent direct access. As such, an alternative method of forcing users to access the publicly-accessible applications through a reverse web proxy is required.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A method for enforcing access control to a web application. The method includes generating, by a user account registration module, a computationally-secure pseudo-random password, associating, by the user account registration module, the generated computationally-secure pseudo-random password with an application username of at least one web client, and storing, in a user account credential store module, the generated computationally-secure pseudo-random password and the associated application username. The method also includes requesting, via a web proxy connected to the at least one web client, access to a protected page offered by the web application, intercepting, by the web proxy, a login page from the web application, and inserting, by the web proxy on behalf of the at least one web client, the stored generated computationally-secure pseudo-random password and the associated application username into the login page. The method also includes forwarding the login page with the inserted computationally-secure pseudo-random password and the associated application username to the web application to complete, by the web proxy, an authentication process with the web application to allow the at least one web client to access the protected page offered by the web application.

A system includes a web proxy interoperably connected to at least one of a web application, a proxy configuration module, a user directory, a user account credential store module, and a user account registration module. The system also includes at least one web client interoperably coupled to the web proxy, and that the at least one web client communicates with the web application via the web proxy. The user account registration module is configured to generate a computationally-secure pseudorandom password and associate the generated computationally-secure pseudo-random password with an application username of a web client of the at least one web client. The web proxy is configured to request access to a protected page offered by the web application, intercept a login page from the web application, insert the generated computationally-secure pseudo-random password and the associated application username into the login page, and forward the login page with the inserted computationally-secure pseudo-random password and the associated application username to the web application to complete an authentication process with the web application to allow the web client to access the protected page offered by the web application.

A computer-program product comprising a computer-usable medium having computer-readable program code embodied therein, the computer-readable program code adapted to be executed to implement a method for enforcing access control to a web application. The method includes generating, by a user account registration module, a computationally-secure pseudo-random password, associating, by the user account registration module, the generated computationally-secure pseudo-random password with an application username of at least one web client, and storing, in a user account credential store module, the generated computationally-secure pseudo-random password and the associated application username. The method also includes requesting, via a web proxy connected to the at least one web client, access to a protected page offered by the web application, intercepting, by the web proxy, a login page from the web application, and inserting, by the web proxy on behalf of the at least one web client, the stored generated computationally-secure pseudo-random password and the associated application username into the login page. The method also includes forwarding the login page with the inserted computationally-secure pseudo-random password and the associated application username to the web application to complete, by the web proxy, an authentication process with the web application to allow the at least one web client to access the protected page offered by the web application.

BRIEF DESCRIPTION OF THE DRAWINGS

A more complete understanding of the method and system of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
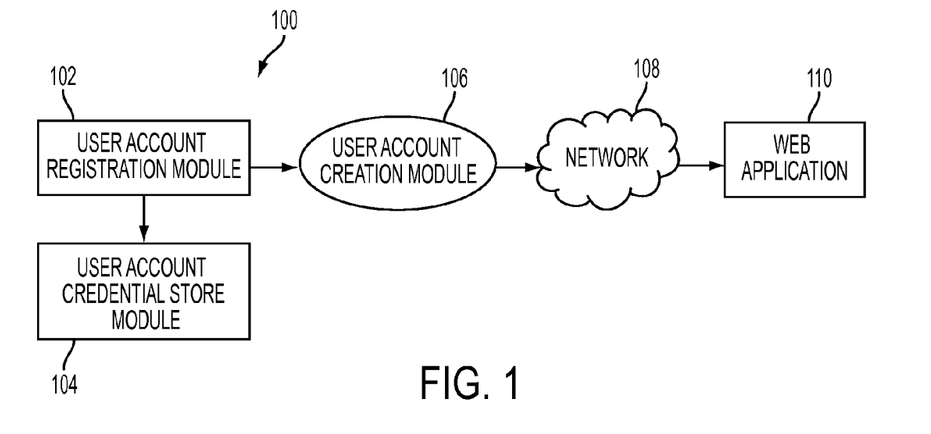
FIG. 1 is a block diagram of a system for implementing a user account registration.

FIG. 1 is a block diagram of a system 100 for implementing a user account registration. The system 100 includes a user account registration module 102, a user account credential store module 104, a user account creation module 106, and a web application 110. In a typical embodiment, the web application 110 is connected to the user account creation module 106 via a network 108 that provides a communication channel between the user account creation module 106 and the web application 110. In a typical embodiment, the network 108 may be, for example, the Internet. In a typical embodiment, the web application 110 may be, for example, a server that is implemented on at least one computer or on a number of hosts each of which is a distinct computer. In other embodiments, the web application 110 may be a multi-tenant web application providing services such as, for example, "Software as a Service" (SaaS).

In a typical embodiment, the user account registration module 102 may be, for example, a server computer equipped with software programs for generating a computationally-secure pseudo-random password and providing instructions for saving user credentials in the user account credential store module 104. The user account credential store module 104 may be, for example, a server computer that is implemented on at least one computer or on a number of hosts each of which is a distinct computer. In a typical embodiment, the user account registration module 102 and the user account credential store module 104, may be located on separate computers. In other embodiments, the user account registration module 102 may be integrated within the user account credential store module 104.

In operation, to create a new user account in the web application 110, an administrator of the web application 110 is required to supply a username and password for the new user account to the web application 110. As such, the administrator of the web application 110 initiates a request at the user account registration module 102 to generate a computationally-secure pseudo-random password and associate a chosen username with the computationally-secure pseudo-random password for a new web application user account. Web application credentials comprising the chosen username and the computationally-secure pseudo-random password along with user identification data is stored in the user account credential store module 104. In a typical embodiment, the administrator of the web application 110 forwards the chosen username and the generated computationally-secure pseudo-random password to the web application 110 in order to create the new user account in the web application 110. In a typical embodiment, the administrator of the web application 110 performs this step by directly interfacing with the web application 110. In other embodiments, this task may be performed automatically by, for example, the user account registration module 102.

Figure 2:
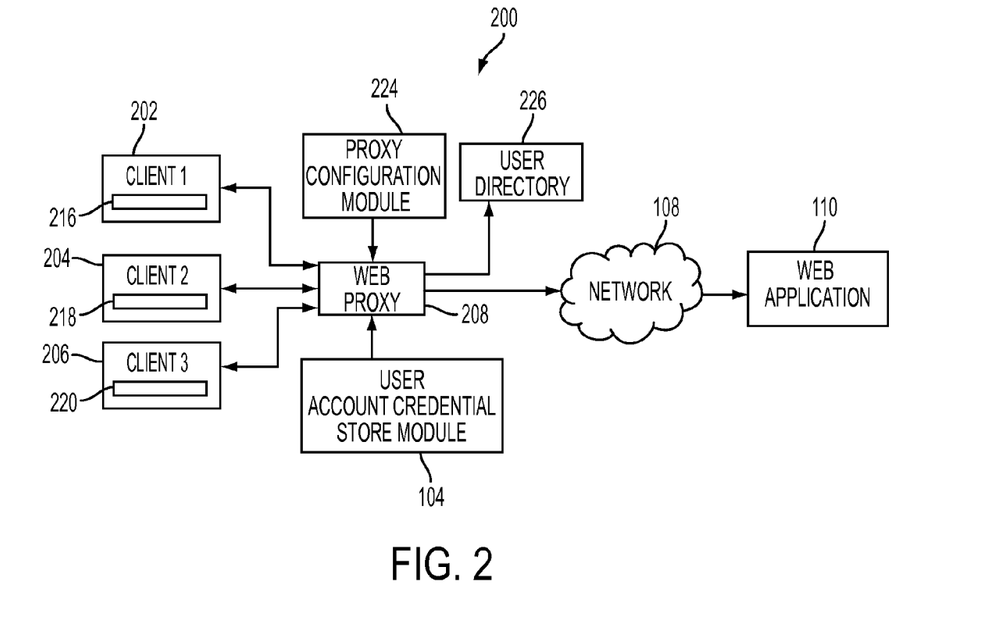
FIG. 2 is a block diagram of a system for implementing user authentication and automatic application login.

FIG. 2 is a block diagram of a system 200 for implementing user authentication and automatic application login. The system 200 includes a plurality of web clients 202, 204, 206, a web proxy 208, a web application 110, the user account credential store 104, a proxy configuration module 224, a user directory 226, and optionally a firewall (not illustrated). In a typical embodiment, the plurality of web clients 202, 204, 206 may be, for example, information handling systems. In a typical embodiment, the web proxy 208 and the web application 110 are interconnected via a public network 108 that provides a communication channel between the web proxy 208 and the web application 110. In a typical embodiment, the network 108 may be, for example, the Internet. For exemplary purposes, only three web clients 202, 204, 206 are illustrated; however, in other embodiments, any number of web clients may be utilized as required. In a typical embodiment, the plurality of web clients 202, 204, 206, may be, for example, a mobile phone, a laptop computer, a tablet computer, a personal digital assistant (PDA), a netbook computer, or any other device capable of including a web browser application 216, 218, 220.

In a typical embodiment, the web proxy 208 may be, for example, a reverse web proxy. In computer networks, a reverse web proxy is a type of web proxy server computer that retrieves resources on behalf of a web client from one or more servers. These resources are then returned to the web client as though they originated from the reverse web proxy itself. For example, the web proxy 208 of the system 200 is a type of web proxy server computer that retrieves resources on behalf of the plurality of web clients 202, 204, 206 from the web application 110 and returns the resources to the web clients 202, 204, 206 as though they originated from the web proxy 208 itself. For purposes of this patent application, the term resource refers to data provided by the web application 110 to the web clients 202, 204, 206, as well as services performed by the web application 110 on behalf of the web clients 202, 204, 206. In a typical embodiment, the services may be, for example, executing an application on data provided by the web clients 202, 204, 206, with results returned to the web clients 202, 204, 206.

Figure 3:
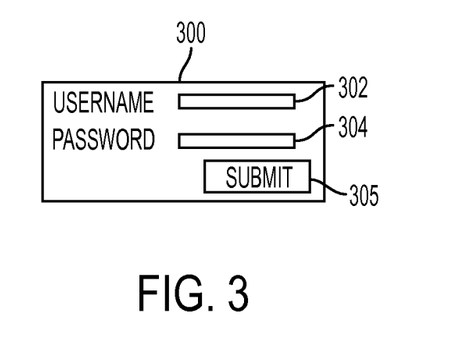
FIG. 3 illustrates a user login page.

In a typical embodiment, the web proxy 208 may be, for example, a server computer equipped with software programs for performing functions such as, for example, user authentication, user authorization and automatic application login. For exemplary purposes, the web client 202 will now be referred to as the web client that sends a request to the web application 110 for a first time to utilize services offered by the web application 110. For example, in operation, when a user utilizes the web browser application 216 on the web client 202 to request a protected page offered by the web application 110 via the web proxy 208, the web proxy 208 first authenticates the user according to corporate policy, as defined by the proxy configuration module 224. In a typical embodiment, the user authentication step involves the user supplying a username and password, and the web proxy 208 performing a lookup of the supplied username and password in the user directory 226, in order to identify the authorized user to the web proxy 208. Having successfully authenticated the user, the web proxy 208 relays the web client's original request to the web application 110. A Web Server of the web application 110 redirects the user's web browser 216 to a login page 300 as illustrated in FIG. 3. The login page 300 comprises a username field 302, a password field 304, and a submit button 305.

In a typical embodiment, the web proxy 208 intercepts the login page 300 and retrieves the username and the previously generated computationally-secure pseudo-random password which corresponds to the web application 110 and the authenticated user, from the user account credential store module 104, and inserts the retrieved username and computationally-secure pseudo-random password into the username and password fields 302, 304 of the login form 300. The web proxy 208 then posts the login form 300, with the username and the computationally-secure pseudo-random password values already inserted into the username and password fields 302, 304 of the login form 300, to the web application 110. In a typical embodiment, the web proxy 208 is a type of web proxy server computer that retrieves resources on behalf of the web client 202 from the web application 110 and returns the resources to the web clients 202, 204, 206 as though they originated from the web proxy 208 itself. In a typical embodiment, the user utilizing the web browser application 216 on the web client 202 only logs in to the web proxy 208 at the beginning of a session and is then afforded access to multiple services offered by the web application 110 without a need for re-authentication.

Figure 4:
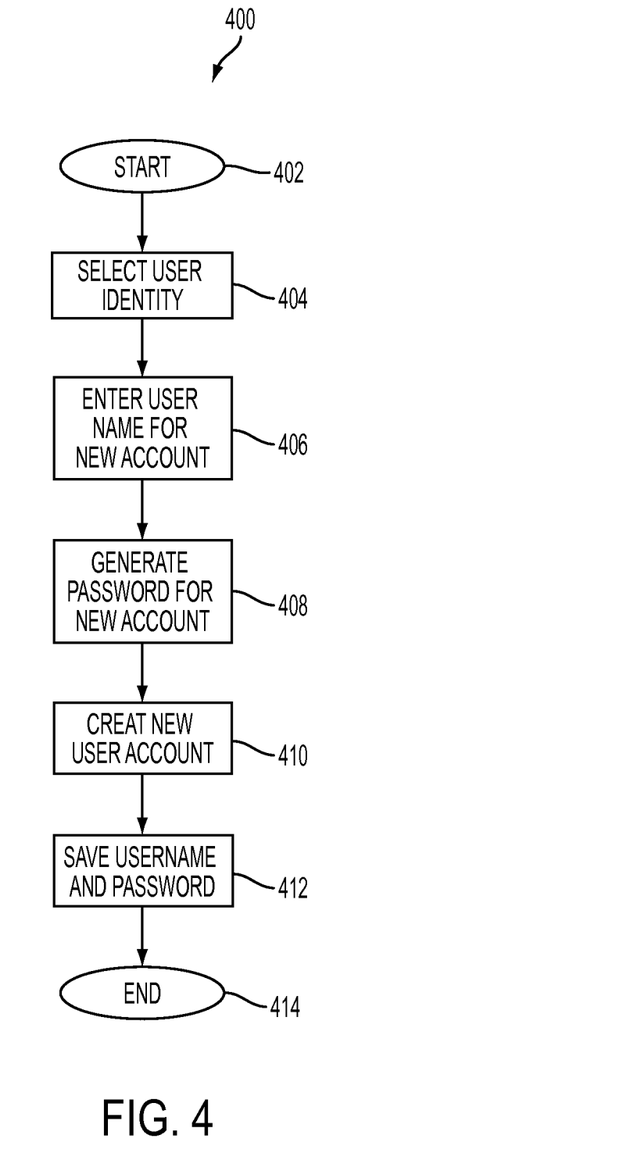
FIG. 4 is a flow illustrating a process for generating and saving a computationally-secure pseudo-random password and creating a new user account.

FIG. 4 is a flow illustrating a process 400 for generating and saving a computationally-secure pseudo-random password and creating a new user account for a web application. For illustrative purposes, the process 400 will be described relative to FIGS. 1-3. The process 400 starts at step 402. At step 404, the administrator invokes the user account registration module 102 and chooses a user, from a list of users authorized to access applications through the web proxy 208, for which a new application user account is to be created. At step 406, the administrator supplies a username for the new application user account to the user account registration module 102. At step 408, the application user account registration module 102 generates a computationally-secure pseudo-random password. In a typical embodiment, the computationally-secure pseudo-random password comprises a series of letters, numbers, and symbols which constitute a value that is deemed to be acceptable as an account password to the web application 110. At step 410, the application account username and the generated computationally-secure pseudo-random password is used to create a user account in the web application 110. At step 412, the application username and generated computationally-secure pseudo-random password is stored in the application user account credential store module 104. At step 414, the process 400 ends.

Figure 5:
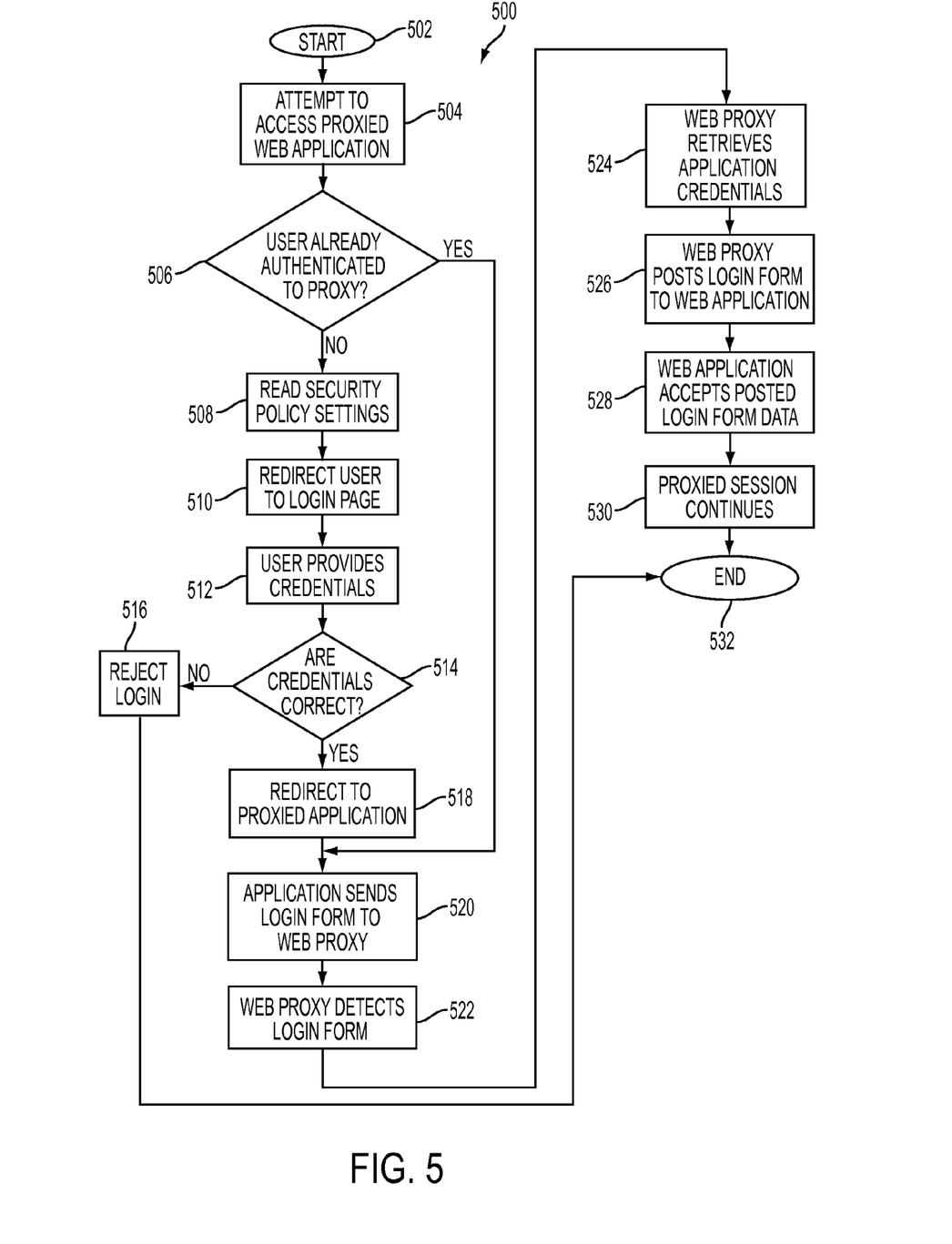
FIG. 5 is a flow illustrating a process for implementing user authentication and automatic application login.

FIG. 5 is a flow illustrating a process 500 for implementing user authentication and automatic application login. For illustrative purposes, the process 500 will be described relative to FIGS. 1-3. The process 500 starts at step 502. At step 504, a user attempts to access a web application 110 via the web proxy 208. At step 506, the web proxy 208 determines, whether the user has already been authenticated to the web proxy 208. If it is determined at step 506 that the user has not already been authenticated to the web proxy 208, the process 500 proceeds to step 508. At step 508, the web proxy 208 reads an organization's security policy settings from the proxy configuration module 224 to determine credentials that are required to authenticate the user. At step 510, in a typical embodiment, the web proxy 208 redirects the user to a login page 300 to request authentication credentials according to the organization's security policy. At step 512, the user provides the authentication credentials as requested. At step 514, the web proxy 208 determines whether the user credentials are correct. If it is determined at step 514 that the user credentials are correct, the process 500 proceeds to step 518. At step 518, the user's client web browser 216 is redirected to the proxied web application 110. From step 518, the process 500 proceeds to step 520. However, if it is determined at step 506 that the user has already been authenticated to the web proxy 208, the process 500 proceeds to step 520. At step 520, the web application 110 sends a login form 300 to the web proxy 208.

At step 522, the web proxy 208 intercepts the login form 300 sent by the web application 110. At step 524, the web proxy 208 retrieves user account credentials belonging to the authenticated user for this web application 110 from the user account credential store module 104. At step 526, the web proxy 208 constructs login form submission data using the user account credentials retrieved in step 524, and presents the login form submission data to the web application 110 as if it had been posted by the user's client web browser 216. At step 528, the web application 110 accepts the login form submission and initiates an application session between the client web browser 216 and the web application 110 via the web proxy 208. At step 530, the session continues until the application session is terminated by either party. From step 530, the process 500 proceeds to step 532. However, if it is determined at step 514 that the user credentials are not correct, the process 500 proceeds to step 532. At step 532, the process 500 ends.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), configuration device (e.g., blade configuration device or rack configuration device), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchpad touchscreen and/or a video display. The information handling system may also include one or more buses operable to transmit communications between the various hardware components.

It is thus believed that the operation and construction of embodiments of the present invention will be apparent from the foregoing description. While the method and system shown or described have been characterized as being preferred it will be obvious that various changes and modifications may be made therein without departing from the spirit and scope of the invention.

What is claimed is:

1. A method for enforcing access control to a web application, the method comprising:
   generating, by a user account registration module, a computationally-secure pseudo-random password;
   associating, by the user account registration module, the generated computationally-secure pseudo-random password with an application username of a web client;
   storing, in a user account credential store module, the generated computationally-secure pseudo-random password and the associated application username;
   requesting, via a web proxy connected to the web client, access to a protected page offered by the web application;
   determining, by the web proxy, whether the web client has previously been authenticated to the web proxy;
   responsive to a determination that the web client has previously been authenticated, intercepting, by the web proxy, a login page from the web application;
   retrieving, by the web proxy, the stored generated computationally-secure pseudo-random password and the associated application username from the user account credential store module;
   inserting, by the web proxy on behalf of the web client, the retrieved stored generated computationally-secure pseudo-random password and the associated application username into the login page;
   wherein the retrieving and inserting is performed by the web proxy that is directly connected to the web client without the need for re-authentication of the web client with the web proxy;
   wherein the web proxy is configured to read an organization's security policy settings from a proxy configuration module to determine credentials required to authenticate the web client and redirect the user to the login page for authentication according to an organization's security policy; and
   forwarding, by the web proxy, the login page with the inserted computationally-secure pseudo-random password and the associated application username to the web application to complete an authentication process with the web application to allow the web client to access the protected page offered by the web application.

2. The method of claim 1, wherein the web proxy is a reverse proxy.

3. The method of claim 1, wherein the web proxy comprises a server computer.

4. The method of claim 1, wherein the web proxy is configured to retrieve resources for the web client from the web application and return the resources to the web client as though they originated from the web proxy.

5. The method of claim 1, wherein the web proxy is configured for enabling Single-Sign-On (SSO) thereby allowing the web client to access multiple services offered by the web application without a need for re-authentication.

6. The method of claim 1, wherein the at least one web client comprises at least one of a mobile phone, a laptop computer, a tablet computer, a personal digital assistant (PDA), a netbook computer, and a device capable of including a web browser application.

7. The method of claim 1, wherein the user account registration module is configured to create a user account with the web application.

8. The method of claim 7, wherein the user account registration module comprises a server computer.

9. The method of claim 1, wherein the web proxy is interconnected to the web application via a network.

10. The method of claim 9, wherein the network is the Internet.

11. A system comprising:
    a web proxy computer server interoperably connected to at least one of a web application, a proxy configuration module, a user directory, a user account credential store module, and a user account registration server computer;
    a web client comprising a processor and interoperably coupled to the web proxy computer server, wherein the web client communicates with the web application via the web proxy computer server;
    wherein the user account registration server computer is configured to generate a computationally-secure pseudorandom password and associate the generated computationally-secure pseudo-random password with an application username of the web client;
    wherein the web proxy computer server is configured to request access to a protected page offered by the web application, determine whether the web client has previously been authenticated to the web proxy computer server and response to a determination that the web client has previously been authenticated, intercept a login page from the web application, retrieve the computationally-secure pseudo-random password and the associated application username from the user account credential store module, insert the generated computationally-secure pseudo-random password and the associated application username into the login page, and forward the login page with the inserted computationally-secure pseudo-random password and the associated application username to the web application to complete an authentication process with the web application to allow the web client to access the protected page offered by the web application;
    wherein the retrieval and insertion is performed by the web proxy computer server that is directly connected to the web client without the need for re-authentication of the web client with the web proxy computer server; and
    wherein the web proxy computer server is configured to read an organization's security policy settings from a proxy configuration module to determine credentials required to authenticate the web client and redirect the user to the login page for authentication according to an organization's security policy.

12. The system of claim 11, wherein the web proxy computer server is interconnected to the web application via a network.

13. The system of claim 12, wherein the network is the Internet.

14. The system of claim 11, wherein the web proxy computer server is configured to retrieve resources on behalf of the web client from the web application and return the resources to the web client as though they originated from the web computer.

15. The system of claim 11, wherein the web proxy computer server is configured for enabling Single-Sign-On (SSO) thereby allowing the web client to access multiple services offered by the web application without a need for re-authentication.

16. The system of claim 11, wherein the web proxy computer server is a reverse proxy computer.

17. The system of claim 11, wherein the user account registration server computer is configured to create a user account with the web application.

18. The system of claim 11, wherein the web client comprises at least one of a mobile phone, a laptop computer, a tablet computer, a personal digital assistant (PDA), a netbook computer, and a device capable of including a web browser application.

19. A computer-program product comprising a non-transitory computer-usable medium having computer-readable program code embodied therein, the computer-readable program code adapted to be executed to implement a method for enforcing access control to a web application, the method comprising:

generating, by a user account registration module, a computationally-secure pseudo-random password;

associating, by the user account registration module, the generated computationally-secure pseudo-random password with an application username of a web client;

storing, in a user account credential store module, the generated computationally-secure pseudo-random password and the associated application username;

requesting, via a web proxy connected to the web client, access to a protected page offered by the web application;

determining, by the web proxy, whether the web client has previously been authenticated to the web proxy;

responsive to a determination that the web client has previously been authenticated, intercepting, by the web proxy, a login page from the web application without re-authentication with the web proxy;

retrieving, by the web proxy, the stored generated computationally-secure pseudo-random password and the associated application username from the user account credential store module;

inserting, by the web proxy on behalf of the web client, the retrieved stored generated computationally-secure pseudo-random password and the associated application username into the login page;

wherein the retrieving and inserting is performed by the web proxy that is directly connected to the web client without the need for re-authentication of the web client with the web proxy;

wherein the web proxy is configured to read an organization's security policy settings from a proxy configuration module to determine credentials required to authenticate the web client and redirect the user to the login page for authentication according to an organization's security policy; and forwarding, by the web proxy, the login page with the inserted computationally-secure pseudo-random password and the associated application username to the web application to complete an authentication process with the web application to allow the web client to access the protected page offered by the web application.

* * * * *